United States Patent
Li et al.

(10) Patent No.: US 11,114,935 B2
(45) Date of Patent: Sep. 7, 2021

(54) SWITCHING-MODE POWER SUPPLY CIRCUIT

(71) Applicant: SHANGHAI TUITUO TECHNOLOGY CO., LTD., Shanghai (CN)

(72) Inventors: Renhong Li, Shanghai (CN); Zhuo Shen, Shanghai (CN)

(73) Assignee: SHANGHAI TUITUO TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 16/914,910

(22) Filed: Jun. 29, 2020

(65) Prior Publication Data

US 2020/0328671 A1 Oct. 15, 2020

Related U.S. Application Data

(63) Continuation of application No. PCT/CN2019/083637, filed on Apr. 22, 2019.

(30) Foreign Application Priority Data

Apr. 24, 2018 (CN) .......................... 201810371989.5

(51) Int. Cl.
*H02M 1/42* (2007.01)
*H02M 1/08* (2006.01)
(Continued)

(52) U.S. Cl.
CPC ........... *H02M 1/4225* (2013.01); *H02M 1/08* (2013.01); *H02M 3/1582* (2013.01);
(Continued)

(58) Field of Classification Search
CPC .... H02M 1/08; H02M 1/4225; H02M 3/1557; H02M 3/1582; H02M 3/33523; H02M 3/3376
(Continued)

(56) References Cited

U.S. PATENT DOCUMENTS 6,101,108 A * 8/2000 Wittenbreder, Jr. ........................ H02M 1/4225
363/65
2013/0127358 A1* 5/2013 Yao .......................... H05B 47/24
315/201

(Continued)

FOREIGN PATENT DOCUMENTS

CN 101394091 A 3/2009
CN 203859682 U 10/2014
(Continued)

*Primary Examiner* — Yemane Mehari
(74) *Attorney, Agent, or Firm* — Muncy, Geissler, Olds & Lowe, P.C.

(57) ABSTRACT

A switching-mode power supply circuit includes a boost inductor, a boost capacitor, a storage capacitor, a transformer or DC-DC inductor, a first switching component, an output rectification component, a filter capacitor, a feedback and control circuit, first and second rectification circuits. When first switching component conducts, the boost inductor, boost capacitor and first switching component form a first boost loop, the boost inductor stores energy, and the storage capacitor, first switching component and transformer or DC-DC inductor form a first DC-DC loop. When first switching component cuts off, the boost inductor, boost capacitor, storage capacitor and transformer or DC-DC inductor form a second boost loop, and the transformer or DC-DC inductor, output rectification component and filter capacitor form a second DC-DC loop. The filter capacitor supplies energy to a load. The feedback and control circuit drives the first switching component to turn on/off according (Continued)

to a chopping wave having specific frequency and duty to control a voltage, current or power output to the load.

11 Claims, 13 Drawing Sheets

(51) Int. Cl.
    *H02M 3/158*     (2006.01)
    *H02M 3/335*     (2006.01)
    *H02M 3/337*     (2006.01)
    *H02M 3/155*     (2006.01)

(52) U.S. Cl.
    CPC ..... *H02M 3/3376* (2013.01); *H02M 3/33523* (2013.01); *H02M 3/1557* (2021.05)

(58) Field of Classification Search
    USPC .......... 363/21.02–21.04, 21.07–21.12, 21.18
    See application file for complete search history.

(56) References Cited

U.S. PATENT DOCUMENTS

| | | |
|---|---|---|
| 2014/0293657 A1 | 10/2014 | Chen et al. |
| 2015/0137694 A1 | 5/2015 | Hong et al. |
| 2015/0303813 A1 | 10/2015 | Cheng et al. |
| 2015/0311805 A1 | 10/2015 | Yamashita |
| 2016/0126851 A1* | 5/2016 | Freeman ................. H02M 1/32 363/21.05 |
| 2020/0328671 A1* | 10/2020 | Li ....................... H02M 1/4258 |
| 2020/0328672 A1* | 10/2020 | Li ....................... H02M 1/4225 |
| 2020/0328683 A1* | 10/2020 | Li ........................... H02M 1/44 |

FOREIGN PATENT DOCUMENTS

| | | |
|---|---|---|
| CN | 203896538 U | 10/2014 |
| CN | 107204717 A | 9/2017 |
| CN | 108471232 A | 8/2018 |
| CN | 108521223 A | 9/2018 |
| TW | 201440399 A | 10/2014 |

\* cited by examiner

SWITCHING-MODE POWER SUPPLY CIRCUIT

CROSS-REFERENCE TO RELATED APPLICATION

This application is Continuation of International Patent Application No. PCT/CN2019/083637, filed on Apr. 22, 2019, entitled "SWITCHING-MODE POWER SUPPLY CIRCUIT" which claims priority of Chinese Patent Application No. 201810371989.5, filed on Apr. 24, 2018, and the entire disclosures of which are incorporated herein.

TECHNICAL FIELD

The present invention relates to the technical field of power electronics, and in particular, relates to a switching mode power supply circuit.

BACKGROUND

A switching mode power supply circuit formed by a combination of boost circuit with single ended and double ended DC-DC converter (flyback, forward, buck-boost, push-pull, ZETA or SEPIC) is able to realize voltage boosting and output converting, and also the function of AC power factor correction.

An AC-DC power supply of an electrical equipment that connects to AC power grid line has to satisfy mandatory requirements on current harmonics according to standard IEC61000-3-2. With respect to different equipment or applications, IEC61000-3-2 has correspondingly defined class A, class B, class C and class D limiting standards for current harmonics.

Existing switching mode power supply technology mainly uses below solutions. Class A: for power supply of less than 80 W, requirements can be met without taking measure; for power supply of between 80 W and 120 W, a passive PFC (power factor correction) circuit with passive components (resistor, inductor) is used; and for power supply of over 80 W, an active PFC circuit (namely a conventional boost circuit) is used. Class B: for power supply of less than 100 W, requirements can be met without taking measure; for power supply of between 100 W and 150 W, a passive PFC circuit with passive components (resistor, inductor) is used; and for power supply of over 100 W, an active PFC circuit (namely a conventional boost circuit) is used. Class C: active PFC circuit (conventional boost circuit). Class D: active PFC circuit (conventional boost circuit).

PFC circuits for realizing power factor correction are classified into passive and active ones. Comparisons of their performances are provided below.

Resistor passive PFC is easily realized at very low cost, but has a high loss, a high temperature and a low power factor, and thus is neither suitable for high power supplies, nor suitable for Class C and Class D equipment. Inductor passive PFC is also easily realized at low cost, but has a relatively high loss and a low power factor, and thus is also not good enough for high power supplies and class C, class D equipment. A boost circuit (active PFC circuit) usually has a high power factor and a high efficiency, can be designed to meet requirements of Class C and Class D equipment, and is suitable for high, medium and small power applications. However, the circuit is complex with more components, leading to a high cost and a large space occupancy.

The active PFC (boost circuit) shown in FIG. 1 is one of the best power factor correction circuits in terms of performance. A traditional switching mode power supply with an active PFC circuit is consisted of a rectification circuit 500, a boost PFC circuit 400 and a DC-DC converter 300. A practical circuit topology is shown in FIG. 1, wherein the DC-DC converter 300 can be a flyback or forward converter; the boost PFC circuit 400 and the DC-DC converter 300 operate independently and are individually controlled by a PFC feedback PWM control unit 100 and a DC-DC feedback PWM control unit 200. The operation principle of the boost PFC circuit is as follows: 1) when Q200 conducts, inductor L100 is charged by AC input voltage applied on C100; 2) when Q200 cuts off, induced voltage on L100 is superimposed with AC input voltage on C100 to charge C200. Therefore, voltage on C200 is always higher than the AC input voltage, so that the boost circuit is a topology for increasing voltage. The duty of Q200 is controlled by the PFC feedback PWM control unit to stabilize the output voltage on C200, which is normally 380 Vdc. The above traditional boost circuit is able to obtain a very high power factor to meet the requirements of IEC61000-3-2, but has below disadvantages: (1) require a complex PWM control circuit to improve the power factor; (2) require an additional power supply circuit for the PWM control circuit for realizing PFC; (3) require an independent switching component and driving circuit, and also a current sensing resistor R100; (4) require a large substrate space and the circuitry design is difficulty; (5) many components and high cost.

SUMMARY OF THE INVENTION

An objective of the present invention is to provide a switching mode power supply circuit to solve the problem of high complexity existed in traditional boost circuits.

To solve the above technical problem, the present invention provides a switching mode power supply circuit, comprising a boost inductor, a boost capacitor, a storage capacitor, a transformer or DC-DC inductor, a first switching component, an output rectification component, a filter capacitor, a feedback and control circuit, a first rectification circuit and a second rectification circuit, wherein:

the first rectification circuit and the storage capacitor form a first rectification loop; the second rectification circuit and the boost capacitor form a second rectification loop; the first rectification circuit and the storage capacitor and the boost capacitor are connected at terminals of a same polarity;

the boost inductor, the boost capacitor, the storage capacitor, the transformer or DC-DC inductor, and the first switching component constitute a boost conversion circuit; the storage capacitor, the transformer or DC-DC inductor, the first switching component, the output rectification component and the filter capacitor constitute a DC-DC converter;

when the first switching component conducts, the boost inductor, the boost capacitor and the first switching component form a first boost loop in which the boost inductor stores energy; and the storage capacitor, the first switching component and the transformer or DC-DC inductor form a first DC-DC loop;

when the first switching component cuts off, the boost inductor, the boost capacitor, the storage capacitor and the transformer or DC-DC inductor form a second boost loop; and the transformer or DC-DC inductor, the output rectification component and the filter capacitor form a second DC-DC loop;

the filter capacitor supplies energy to a load; the feedback and control circuit is configured to output a chopping wave with a certain frequency and duty to drive the first switching component to conduct or cut off, so as to control an output of voltage or current or power for the load.

Optionally, the switching mode power supply circuit further comprises a second switching component, wherein the boost inductor, the boost capacitor, the storage capacitor, the transformer, the first switching component and the second switching component constitute the boost conversion circuit; the storage capacitor, the transformer, the first switching component, the second switching component, the output rectification component and the filter capacitor constitute the DC-DC converter;

when the first switching component and the second switching component both conduct, the boost inductor, the boost capacitor and the first switching component form the first boost loop in which the boost inductor stores the energy; and the storage capacitor, the first switching component, the second switching component and the transformer form the first DC-DC loop;

when the first switching component cuts off and the second switching component conducts or cuts off, the boost inductor, the boost capacitor, the storage capacitor, the transformer and the second switching component form the second boost loop; and the transformer, the output rectification component and the filter capacitor form the second DC-DC loop.

Optionally, the switching mode power supply circuit further comprises an inrush current limiting circuit that is coupled to the first rectification loop and not coupled to any of the second rectification loop, the first boost loop, the second boost loop and the first DC-DC loop.

Optionally, the switching mode power supply circuit further comprises a resonance prevention rectification component, wherein when the first switching component cuts off and after zero return of a current of the boost inductor, the resonance prevention rectification component prevents the storage capacitor from charging the boost inductor and the boost capacitor.

Optionally, the DC-DC converter is a flyback power supply, and the transformer or DC-DC inductor is a flyback transformer, wherein the flyback transformer has a secondary winding that supplies energy to the load via the output rectification component and the filter capacitor.

Optionally, the DC-DC converter is a forward power supply, the switching mode power supply circuit further comprises a choke coil, and the output rectification component comprises a first output rectification component and a second output rectification component, wherein the transformer has a secondary winding that charges the choke coil via the first output rectification component and the second rectification component, and the choke coil supplies energy to the load via the filter capacitor.

Optionally, the DC-DC converter is a buck-boost circuit, and the transformer or DC-DC inductor is a buck-boost inductor, wherein the buck-boost inductor supplies energy to the load through the output rectification component and the filter capacitor.

Optionally, the DC-DC converter is a ZETA circuit, the switching mode power supply circuit further comprises a coupling capacitor and a choke coil, and the transformer or DC-DC inductor is a ZETA inductor, wherein the ZETA inductor charges the choke coil through the coupling capacitor and the output rectification component, and the choke coil supplies energy to the load via the filter capacitor.

Optionally, the DC-DC converter is a double-ended push-pull circuit, the switching mode power supply circuit further comprises a choke coil, and the output rectification component comprises a first output rectification component and a second output rectification component, wherein the transformer has a secondary winding that charges the choke coil through the first output rectification component and the second output rectification component, and the choke coil supplies energy to the load via the filter capacitor.

Optionally, the DC-DC converter is a SEPIC circuit, the switching mode power supply circuit further comprises a coupling capacitor and a choke coil, and the transformer or DC-DC inductor includes the SEPIC inductor and the choke coil; wherein when the first switching component conducts, the storage capacitor charges the SEPIC inductor, the coupling capacitor charges the choke coil, and an accumulated energy on the filter capacitors is supplied to the load; when the first switching component cuts off, the SEPIC inductor supplies energy to the load through the coupling capacitor, the filter capacitor and the output rectification component, and the choke coil also supplies energy to the load through the output rectification component and the filter capacitor.

Optionally, the first rectification circuit and the second rectification circuit each comprise a diode or a switching component serving as a rectification component, when the rectification component is implemented as a switching component, the switching mode power supply circuit further comprises an AC phase detecting and rectification control unit that monitors a phase of an AC input current to the first rectification circuit and the second rectification circuit, and controls the switching component to conduct or cut off.

The SMPS circuit provided by the present invention comprises two input rectification loops for outputting voltages to storage capacitor and boost capacitor, respectively. The storage capacitor and the boost capacitor are connected at terminals of the same voltage polarity. The storage capacitor also serves as an output capacitor of the boost circuit. The SMPS circuit further comprises DC-DC converter and first switching component connected between the storage capacitor (positive terminal) and the positive input terminal of the DC-DC converter (primary winding of transformer, buck-boost inductor or Zeta inductor, etc.). Boost inductor and boost capacitor are connected in series and then parallelly connected to the first switching component. One terminal of the boost capacitor is connected to a positive terminal of the storage capacitor, and the other terminal is connected to two poles (L and N) of AC input through the second rectification circuit, or connected to negative pole of DC input. The feedback control circuit controls the turn-on (conduct) and turn-off (cut off) of the first switching component to realize the conversion output of the SMPS circuit, and to realize simultaneous operation of the boost circuit and the DC-DC converter (flyback, buck-boost, forward, push-pull, Zeta, etc.) topology to boost and convert input voltage and to achieve power factor correction for AC power supply. The SMPS circuit of the present invention adopts an active PFC circuit (boost circuit), which has a good active PFC performance. As the PWM (or PFM) control unit and the power switching component (first switching component) in the DC-DC converter (flyback, forward) downstream to the PFC circuit is shared, the PWM control unit and power switching component required in a conventional boost PFC circuit can be eliminated, thereby reducing the cost and volume, simplifying the design of power supply product, and achieving advantages of high performance, low cost and miniaturization.

According to the present invention, a low cost, less part count, compact SMPS circuit with active PFC function can be achieved. Firstly, the result of PFC can shape an AC input current into a substantially sinusoidal waveform satisfying IEC61000-3-2 requirements on input harmonics. Secondly, the boost circuit and the flyback (or forward) DC-DC converter of the present invention share one switching component, eliminating the switching component and corresponding drive circuit required by traditional PFC circuits, reducing the cost and part count, simplifying the circuit so as to improve reliability, and can be installed with a smaller PCB space. Moreover, during the cut-off of the switching component, the current flow into the DC-DC transformer has a reversed direction compared to that during turn-on of the switching component, it partially helps reset the transformer and reduce magnetic flux density Bmax, reduce core loss, prevent saturation, so as to enable cost reduction of the components. Furthermore, as the active PFC circuit shares the PWM control of the DC-DC converter, the control can be designed as open-loop control, so that there is no problem of loop stability, also there is no audible noise problem due to closed-loop control encountered by traditional active PFC circuits during turn-on or operation of the circuit.

DETAILED DESCRIPTION OF EXEMPLARY EMBODIMENTS

Figure 1:
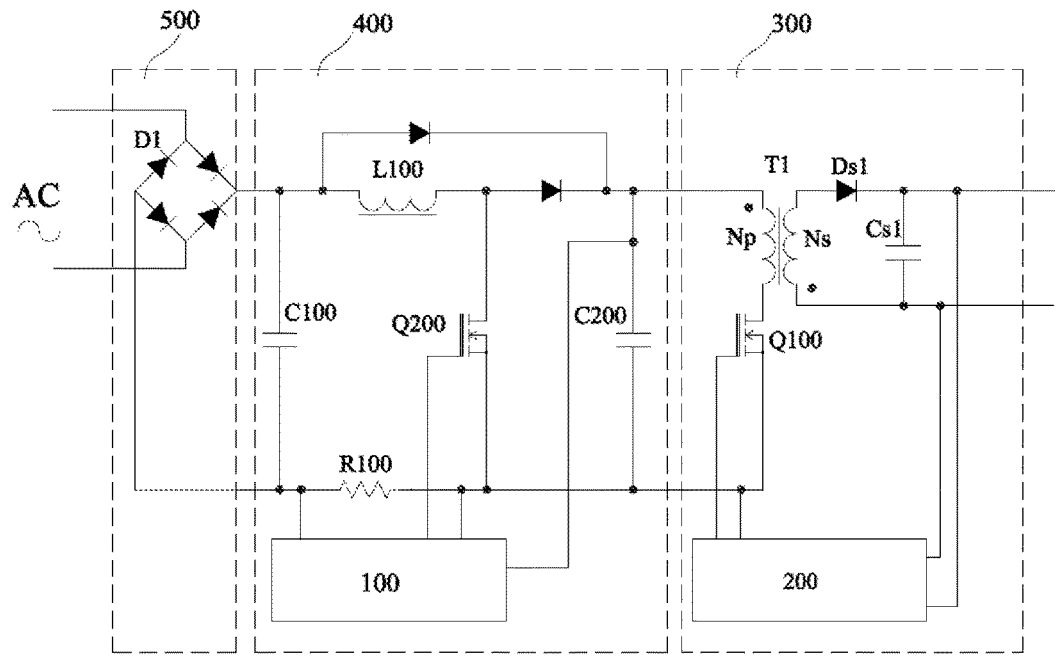
FIG. 1 is a schematic diagram of a conventional Boost-PFC flyback SMPS circuit including a PFC circuit.

The following embodiments together with figures further describe the SMPS circuit of the present invention. According to the description and claims, advantages and features of the present invention will become more obvious. It should be noted that attached figures are not precisely proportional to the actual. They are just for the purpose of assisting the description of embodiments of the present invention in an easy and clear manner.

The core concept of the present invention is to provide a switching mode power supply circuit to solve the problem of high complexity existed with traditional boost circuits.

To achieve this, the present invention provides a switching mode power supply circuit, comprising a boost inductor, a boost capacitor, a storage capacitor, a transformer or DC-DC inductor, a first switching component, an output rectification component, a filter capacitor, a feedback and control circuit, a first rectification circuit and a second rectification circuit, wherein:

the first rectification circuit and the storage capacitor form a first rectification loop; the second rectification circuit and the boost capacitor form a second rectification loop; the first rectification circuit and the storage capacitor and the boost capacitor are connected at terminals of a same polarity;

the boost inductor, the boost capacitor, the storage capacitor, the transformer or DC-DC inductor, and the first switching component constitute a boost conversion circuit; the storage capacitor, the transformer or DC-DC inductor, the first switching component, the output rectification component and the filter capacitor constitute a DC-DC converter;

when the first switching component conducts, the boost inductor, the boost capacitor and the first switching component form a first boost loop in which the boost inductor stores energy; and the storage capacitor, the first switching component and the transformer or DC-DC inductor form a first DC-DC loop;

when the first switching component cuts off, the boost inductor, the boost capacitor, the storage capacitor and the transformer or DC-DC inductor form a second boost loop; and the transformer or DC-DC inductor, the output rectification component and the filter capacitor form a second DC-DC loop;

the filter capacitor supplies energy to a load; the feedback and control circuit is configured to output a chopping wave with a certain frequency and duty to drive the first switching component to conduct or cut off, so as to control an output of voltage or current or power for the load.

An embodiment of the present invention provides a SMPS circuit. As shown in FIGS. 2-5, 7, 9-18, 21, the SMPS circuit comprises: boost inductor L1, boost capacitor C1, storage capacitor C2, transformer or DC-DC inductor T1, first switching component Q1, output rectification component Ds1, filter capacitor Cs1, feedback and control unit 40, first rectification circuit 11 and second rectification circuit 12, wherein: first switching component could be MOSFET, bi-polar transistor, SiC or GaN FET, etc.; first rectification circuit 11 and storage capacitor C2 form a first rectification loop; second rectification circuit 12 and boost capacitor C1 form a second rectification loop; an output of the first rectification circuit 11 is connected to terminals of the same voltage polarity of the boost capacitor C1 and storage capacitor C2; boost inductor L1, boost capacitor C1, storage capacitor C2, transformer or DC-DC inductor T1 and first switching component Q1 constitute a boost conversion circuit 20; storage capacitor C2, transformer or DC-DC inductor T1, first switching component Q1, output rectification component Ds1 and filter capacitor Cs1 constitute a DC-DC converter 30. When the first switching component Q1 conducts, the boost inductor L1, boost capacitor C1 and first switching component Q1 form a first boost loop, so that the boost inductor L1 stores the energy; at the same time, the storage capacitor C2, first switching component Q1 and the transformer or DC-DC inductor T1 form a first DC-DC loop. When the first switching component Q1 cuts off, the boost inductor L1, boost capacitor C1, storage capacitor C2 and the transformer or DC-DC inductor T1 form a second boost loop; at the same time, the transformer or DC-DC inductor T1, output rectification component Ds1 and filter capacitor Cs1 form a second DC-DC loop. Outputs (i.e. both terminals) of the filter capacitor Cs1 are connected to load. The feedback and control unit 40 outputs a chopping wave with a certain frequency and duty, to drive the first switching component Q1 to conduct or cut off, so as to control the output of voltage or current or power to the load. The feedback and control unit 40 could directly sample output voltage, current or power, or indirectly sample the voltage, current or power from T1's primary winding, or based on average PWM waveform.

Figure 2:
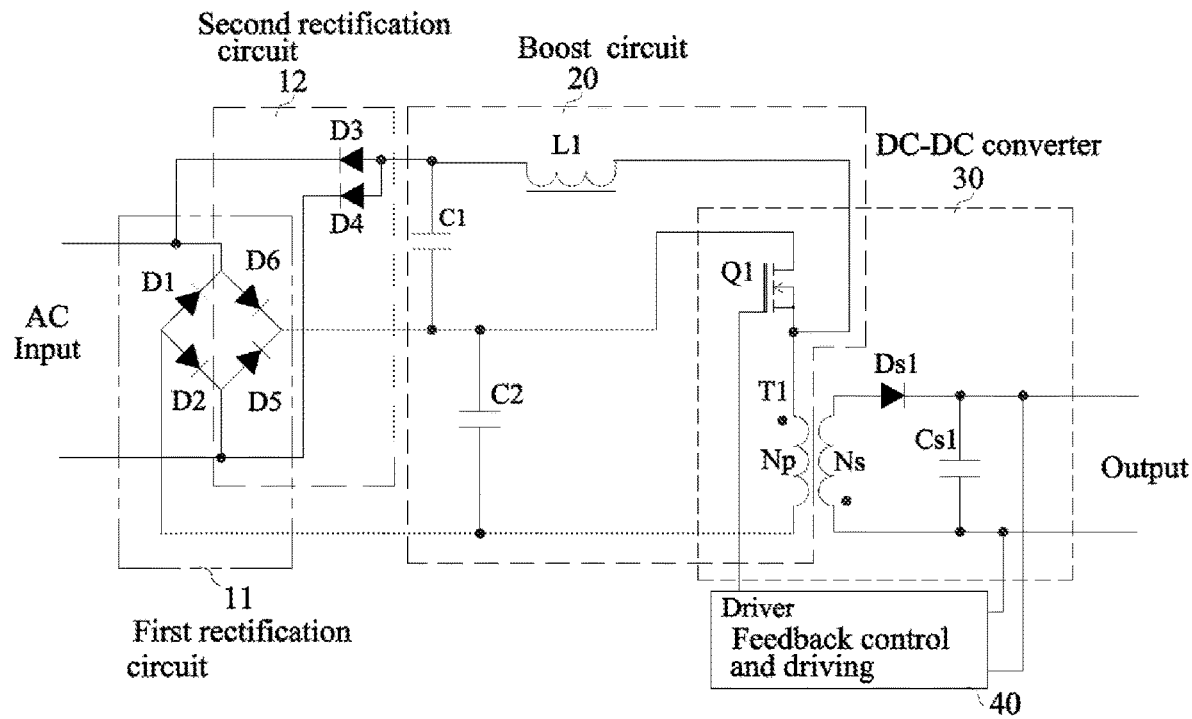
FIG. 2 is a schematic diagram of the SMPS circuit according to an embodiment of the present invention.

An example of detailed circuit is shown in FIG. 2: the first rectification circuit 11 is connected to two terminals of the storage capacitor C2; the second rectification circuit 12 is connected to two terminals of the boost capacitor C1; the first terminal of the boost capacitor C1 is connected to the first terminal of the storage capacitor C2 and the drain of the first switching component Q1; the second terminal of boost capacitor C1 is connected to the first terminal of the boost inductor L1; the second terminal of the boost inductor L1 is connected to the source of the first switching component Q1 and also to the positive input terminal of the DC-DC converter 30 (input terminal of primary winding of transformer T1, or input terminal of buck-boost inductor, or input terminal of ZETA inductor, etc.); the second terminal of the storage capacitor C2 is connected to the negative input terminal or center-tapped terminal of the DC-DC converter 30 (output terminal of primary winding of transformer T1, or output terminal of buck-boost inductor, or output terminal of ZETA inductor, etc.); a control electrode of the first switching component Q1 is connected to the output of the feedback and control unit 40; the input terminal of the feedback and control unit 40 is connected to the output of the DC-DC converter, so that the feedback and control unit 40 samples the output voltage of the DC-DC converter, and control turn-on and turn-off of the first switching component Q1 according to the output voltage, so as to realize ideal output voltage values.

The SMPS circuit of the present invention is equipped with two input rectification circuits, a PFC circuit (boost) and a single-ended or double-ended DC-DC converter. The first rectification circuit 11 for the boost capacitor C1 of the boost conversion circuit 20 is partially overlapped in loop but different from the second rectification circuit 12 for the storage capacitor C2, wherein the overlapped portion is a positive node of rectified voltage for the boost capacitor C1, and a positive node of rectified voltage for the storage capacitor C2 (namely D5 and D6). The first switching component Q1 is connected to high-voltage (positive) node of rectified DC voltage, and is also connected to the primary winding of DC-DC transformer T1. The boost inductor L1 is connected in series with the boost capacitor C1 and then parallelly connected to two terminals of the first switching component Q1. One terminal of the boost capacitor C1 is connected to the high-voltage (positive) node of the rectified DC voltage (high-voltage node of the storage capacitor C2), and the other terminal is connected to two poles of the AC input through input rectification components D3 and D4, respectively.

Figure 3:
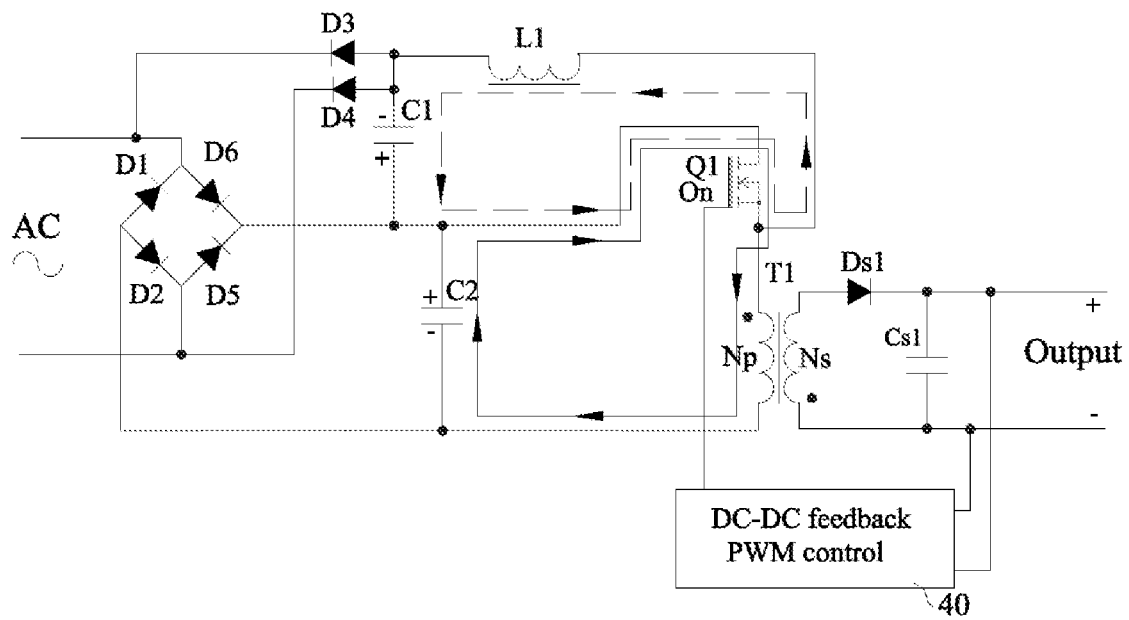
FIG. 3 shows current loop during turn-on of first switching component according to another embodiment of the present invention.

Operating principle of the present invention to realize PFC is: Q1 is both the switching component for flyback or forward DC-DC converter and the main switching component for PFC. Under control of PWM, Q1 not only acts as a driver for DC-DC power transmission, but also acts as a driver for input power factor correction. The steps are as follows: See state 1 as shown in FIG. 3, when Q1 conducts, boost inductor L1 is charged by AC input voltage on C1 through D3, D4, and stores energy. Simultaneously, Q1 drives transformer T1 of the DC-DC converter. When Q1 conducts, energy in storage capacitor C2 flows through Q1 into primary winding Np of transformer T1, current loop of which is indicated by arrow of solid line, and energy of DC-DC conversion is stored in T1. At the same time, energy in boost capacitor C1, which reflects changes in the instant AC input voltage, flows through Q1 into boost inductor L1, current loop of which is indicated by arrow of dashed line, and energy of boost conversion is stored in L1.

Figure 4:
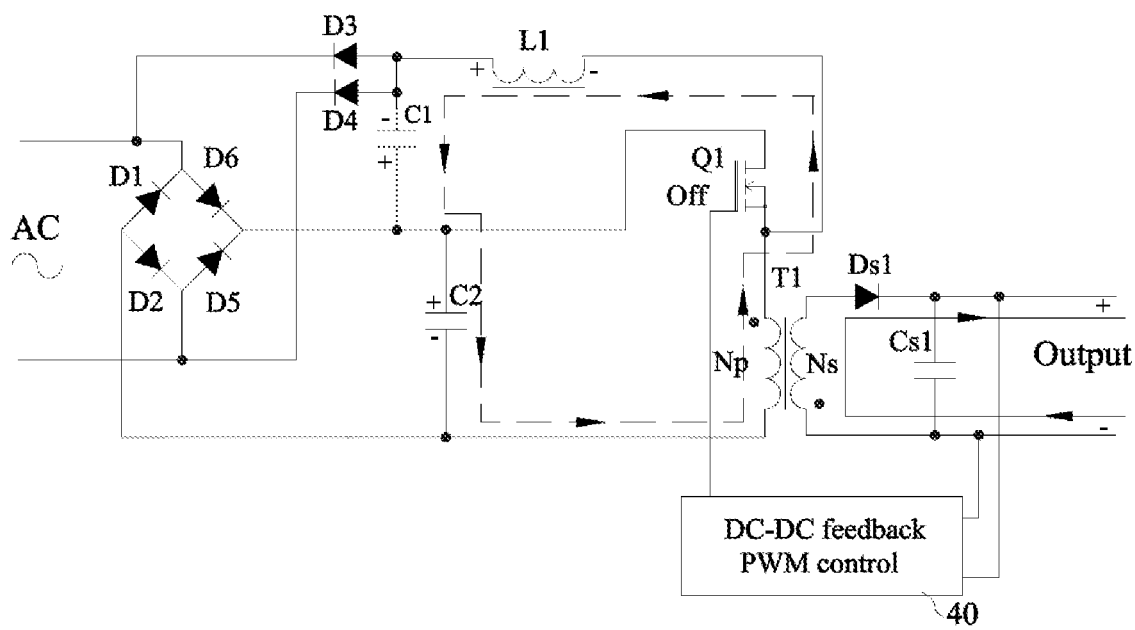
FIG. 4 shows boost current loop during cut-off of the first switching component according to another embodiment of the present invention.

See state 2 as shown in FIG. 4: Q1 cuts off, and transformer T1 transfers energy by alternating current. Induced voltage on L1 is superimposed with AC input voltage on C1 to charge C2 through the primary winding of transformer T1. The energy stored in T1 is released to the load through the secondary winding Ns, the output rectification circuit Ds1, and the filter capacitor Cs1, as there is no releasing loop at the primary side. Thus, completing isolated energy transfer and conversion of the flyback DC-DC converter. The amount of energy transferred is controlled by the feedback and controlled unit 40. Simultaneously, energy stored in the boost inductor L1 generates an induced voltage upon Q1's cut-off, and the induced voltage superimposes with voltage on boost capacitor C1 to charge storage capacitor C2 through the primary winding of the transformer T1, thereby accomplishing boost conversion. There is a little portion of energy transferred to the secondary side circuit via the transformer T1 without any waste. The boost PFC circuit absorbs energy from the AC input through the boost inductor L1 and boost capacitor C1, during intervals of switching on and switching off of the switching component Q1, according to changes of the AC input voltage and phase, so as to shape AC input current in phase with AC input voltage, to attain PFC function. The requirements of IEC6100-3-2 standard can be satisfied with a greatly reduced component number and cost comparing to traditional active PFC circuits.

Figure 5:
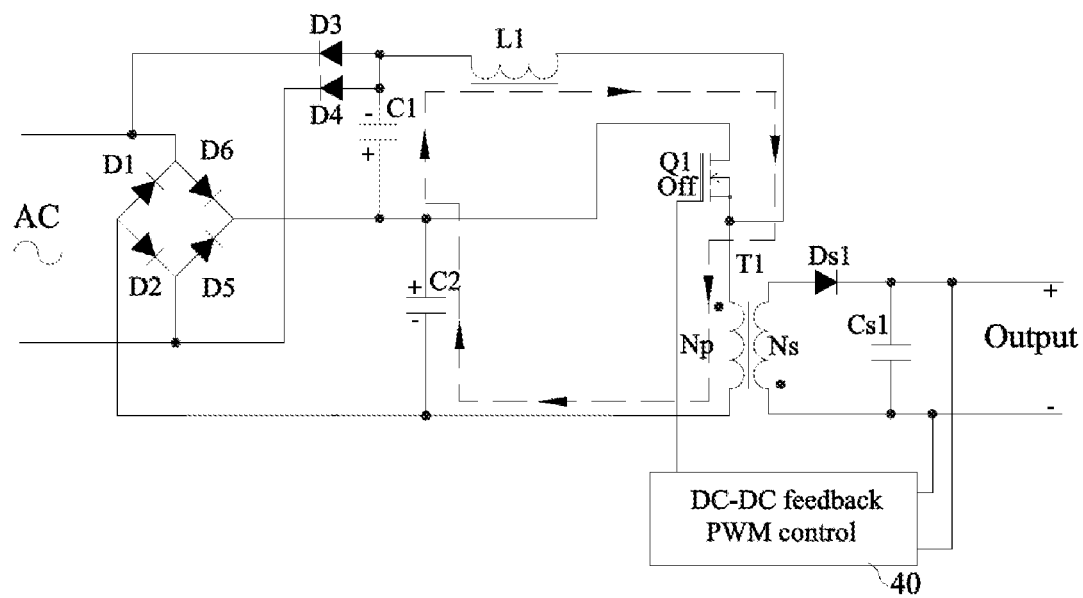
FIG. 5 shows resonance current loop during cut-off of the first switching component according to another embodiment of the present invention.
Figure 6:
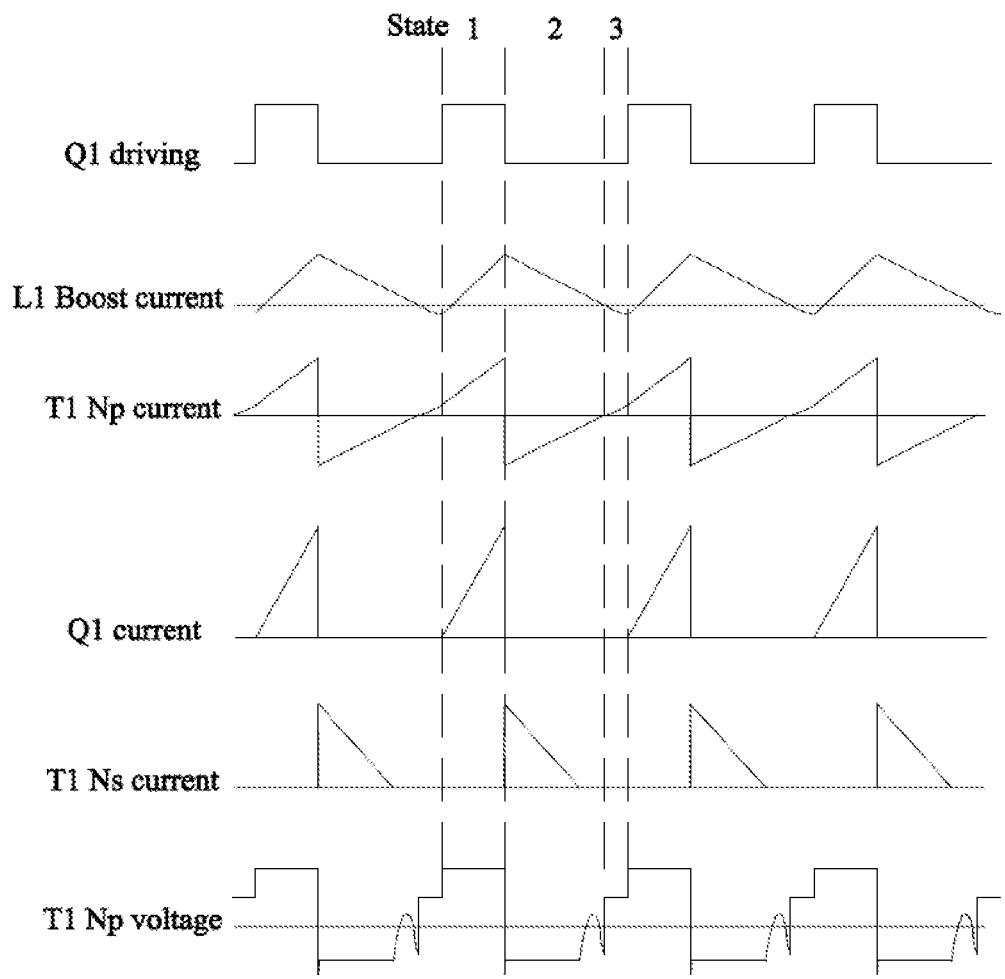
FIG. 6 shows operating waveform of the SMPS circuit according to another embodiment of the present invention.
Figure 21:
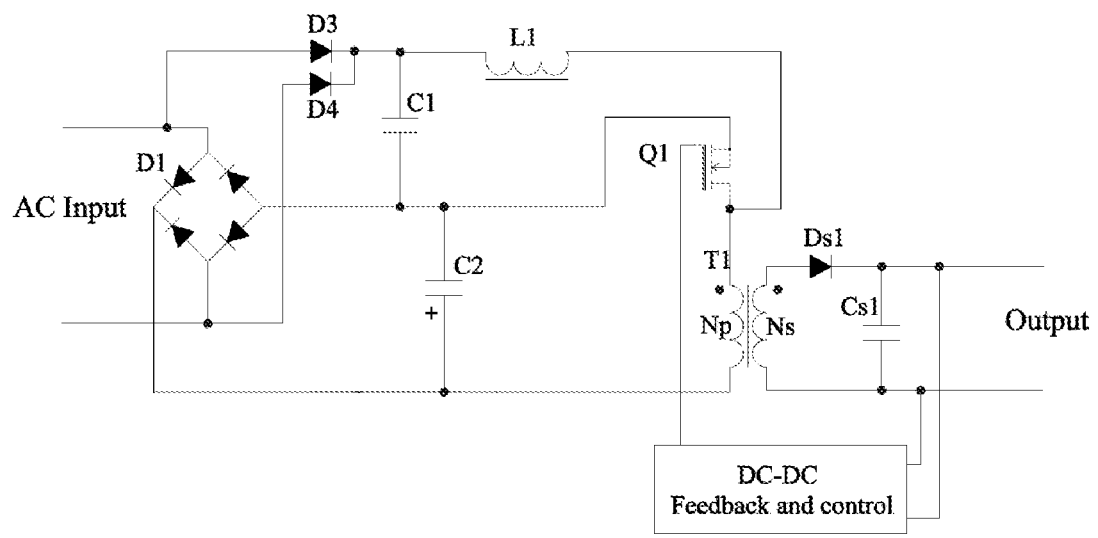
FIG. 21 is a schematic diagram of the SMPS circuit according to another embodiment of the present invention.

See state 3 as shown in FIG. 5: when energy in boost inductor L1 is completely released, and Q1 keeps in the cut-off state, resonant current is generated; L1 and T1 store energy. If operating frequency is high, the total resonant inductance (L1+T1) will be very large, the corresponding resonant current will be very small, and hence can be omitted as the time is much greater than the time of Q1's cut-off. In this way, the voltage on C2 is greater than the AC input voltage, accomplishing boosting. The duty of Q1 is controlled by the PWM control circuit. The feedback and control of the duty can stabilize the DC-DC voltage output. And this PWM also controls the operation of the boost circuit to be in synchronous with the DC-DC converter. In addition, due to the same duty provided by PWM, the voltage on C2 is proportional to the duty for DC-DC adjustment. Therefore, when the output of DC-DC is controlled by adjusting duty through PWM feedback control, the voltage of C2 is simultaneously adjusted in the same direction, thereby increasing the gain of feedback and facilitating the attenuation of DC-DC output ripple. Operating waveform of states 1 to 3 is shown in FIG. 6. If the boost inductor L1 operates in a continuous current mode (CCM), resonance of boost inductor and boost capacitor in state 3 would not occur. FIG. 21 is an example of this embodiment (FIG. 2) in which negative voltage terminals of D1, C1 and C2 are connected, and the operation principle is same as this embodiment.

Integration of active PFC and flyback DC-DC converter: primary side components, i.e. storage capacitor C2, switching component Q1 and main transformer T1, secondary side components, i.e. output rectification component Ds1 and filter capacitor Cs1, and feedback and control unit 40 constitute a single ended flyback DC-DC converter; switching component Q1, boost inductor L1, boost capacitor C1 and storage capacitor C2 constitute A boost active PFC circuit.

Figure 9:
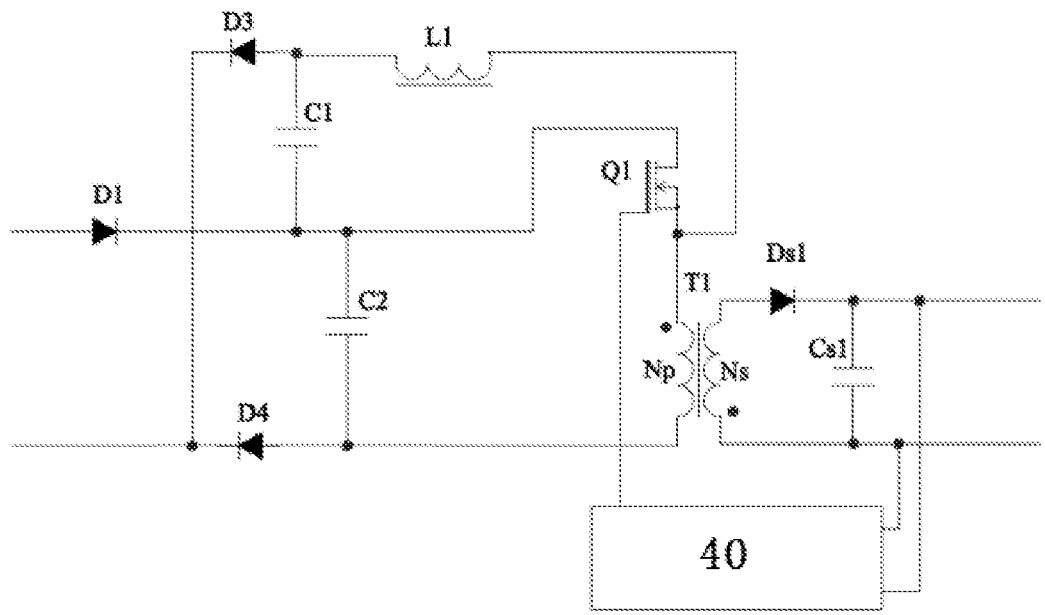
FIG. 9 is a schematic diagram of the SMPS circuit according to another embodiment of the present invention.

Specifically, in the SMPS circuit, the first rectification circuit includes a first rectification component D1 and a second rectification component D2, and the second rectification circuit includes a third rectification component D3 and a fourth rectification component D4. The first rectification component D1, the second rectification component D2, a fifth rectification component D5 and a sixth rectification component D6 constitute a full-wave rectification circuit. The third rectification component D3, and the fourth rectification component D4, the fifth rectification component D5 and the sixth rectification component D6 constitute another full-wave rectification circuit. Or alternatively as shown in FIG. 9, in the SMPS circuit, the first rectification circuit includes a third rectification component D3 and the second rectification circuit includes a fourth rectification component D4. The first rectification component D1 and the third rectification component D3 constitute a half-wave rectification circuit, and the first rectification component D1 and the fourth rectification component D4 constitute another half-wave rectification circuit. The half-wave rectification circuit is suitable for DC, full-wave or half wave AC input applications, and its operation is similar to full-wave rectification circuit, namely to boost input voltage and then convert, so as to expand the input operating voltage range. D1, D3, D4 can be replaced by low impedance switching components, and can also achieve the rectification function, while improving efficiency of the power supply.

Figure 7:
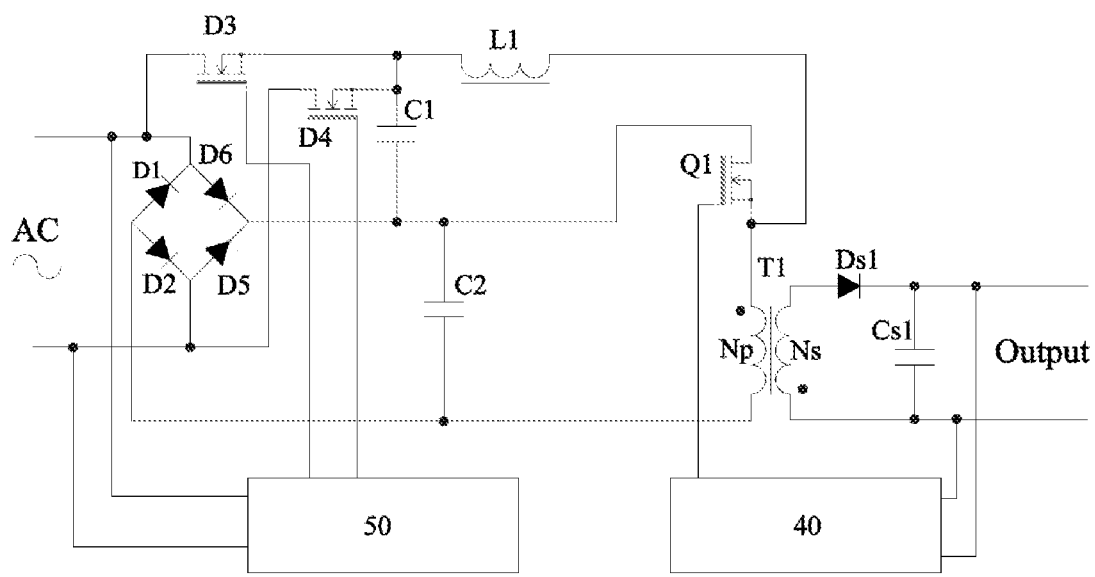
FIG. 7 is a schematic diagram of the SMPS circuit according to another embodiment of the present invention.
Figure 8:
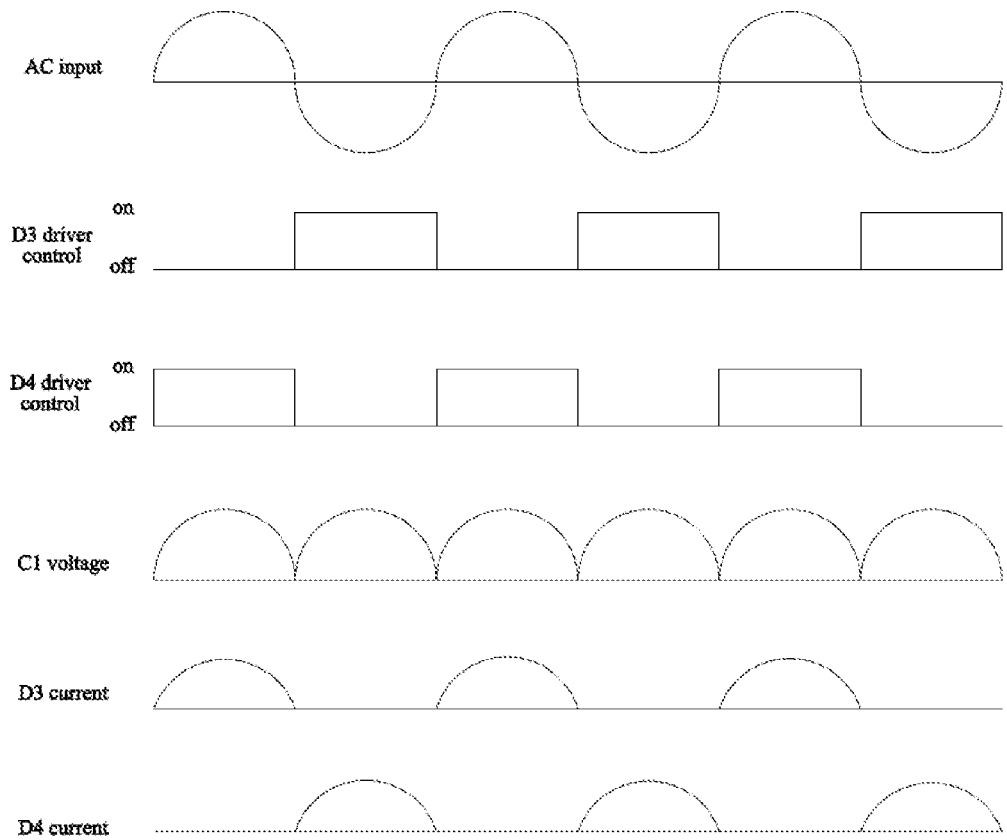
FIG. 8 shows control waveform of the SMPS circuit according to another embodiment of the present invention.

In addition, in the SMPS circuit, the rectification components are diodes or switching components. As illustrated in FIG. 7, the third rectification component D3 and the fourth rectification component D4 are implemented as MOSFETs. When some of the rectification components are implemented as switching components, the SMPS circuit shall further comprise an AC phase monitoring and rectification control unit 50. The AC phase monitoring and rectification control unit 50 monitors phase of the respective AC current input into the first rectification circuit (the first rectification component D1 and/or the second rectification component D2) and the second rectification circuit (the third rectification component D3 and/or the fourth rectification component D4), and controls the turn-on and turn-off of the MOSFETs (e.g. the third and fourth rectification components D3, D4). FIG. 8 illustrates an exemplary operating waveform after input phase monitoring and rectification control. Boost circuit's input rectification diodes D3 and D4 can be replaced by low impedance switching components like MOSFETs, to achieve the objective of high efficiency and energy saving. The operation principle of the boost circuit is same as above. The rectification part charges the storage capacitor C2 and rectifies and charges the boost capacitor C1. The Control circuit monitors the voltage and phase of the AC input, and controls turn-on and cut-off of the switching components D3 and D4, to realize full wave rectification to charge C1. As the switching component D3 or D4 can be designed as continuously conducting during each half-wave rectification process, there would be no switching loss, and the efficiency could be better than bridgeless PFC circuits. Control the dead time between conduction of D3 and D4 could improve surge immunity.

Dual rectification part: D1, D2, D5 and D6 rectify AC input voltage in full-wave mode to store energy in storage capacitor C2. When boost circuit operates, energy output by boost circuit makes the voltage on C2 generally higher than AC input voltage, so that the AC input voltage no longer charges C2. When the energy output by boost circuit is not sufficient to maintain the voltage on C2 higher than the AC input voltage, the AC input could again charge C2. D3 to D6 constitute another full-wave rectification loop to charge the boost capacitor C1. Due to the low capacitance of C1, the voltage on C1 is substantially close to the waveform after full-wave rectification of the AC input voltage. In active boost PFC circuit, the main function of the boost capacitor C1 is to filter high frequency switching noise, to attenuate EMI emission.

Figure 10:
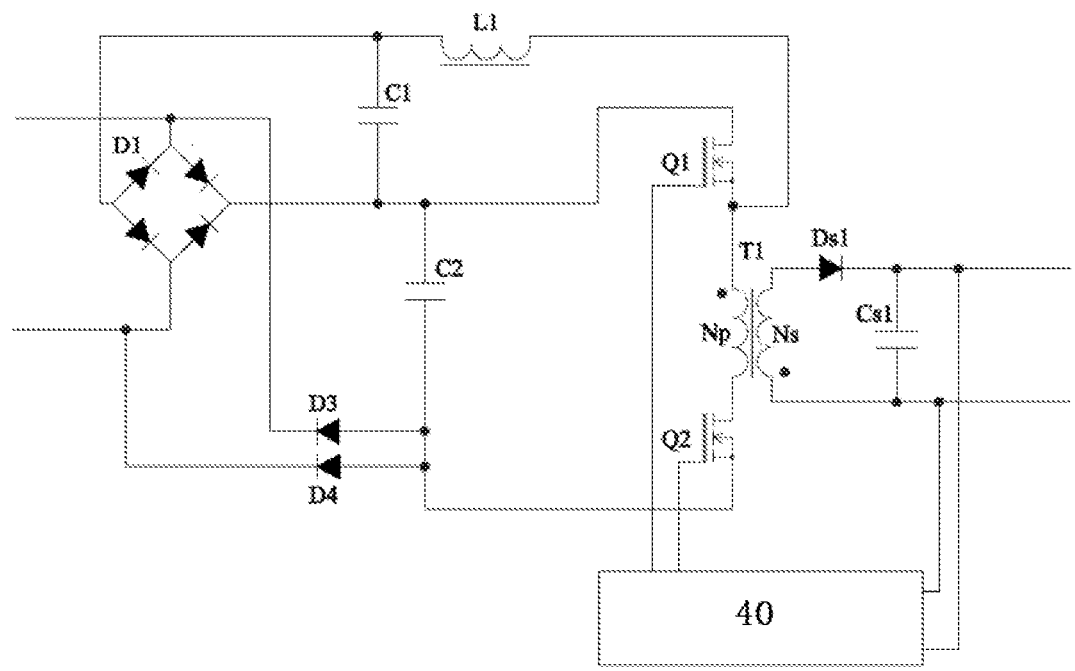
FIG. 10 is a schematic diagram of the SMPS circuit according to another embodiment of the present invention.

As shown in FIG. 10, the SMPS circuit further comprises a second switching component Q2. The boost inductor L1, boost capacitor C1, storage capacitor C2, transformer T1, first switching component Q1 and second switching component Q2 constitute a boost conversion circuit 20. The storage capacitor C2, transformer T1, first switching component Q1, second switching component Q2, output rectification component Ds1 and filter capacitor Cs1 constitute a DC-DC converter 30. When both the first switching component Q1 and second switching component Q2 conduct, the boost inductor L1, boost capacitor C1 and first switching component Q1 form a first boost loop, and the boost inductor L1 stores energy; at the same time, the storage capacitor C2, first switching component Q1, second switching component Q2 and transformer T1 form a first DC-DC loop. When the first switching component Q1 cuts off and the second switching component Q2 conducts or cut offs, the boost inductor L1, boost capacitor C1, storage capacitor C2, transformer T1 and second switching component Q2 form a second boost loop; at the same time, the transformer T1, output rectification component Ds1 and filter capacitor Cs1 form a second DC-DC loop. The second switching component Q2 could be MOSFET, Bi-polar transistor, IGBT, SiC or GaN FET, etc. Detailed example is shown in FIG. 10: the drain of the second switching component Q2 is connected to the negative input of the DC-DC converter; the source of the second switching component Q2 is connected to the second terminal of the storage capacitor C2; the control electrode of the second switching component Q2 is connected to the output of the feedback and controlled unit 40. In this embodiment, the single-ended flyback converter is modified from single transistor Q1 to double transistors (i.e. double-ended flyback topology) Q1 and Q2 (cascade flyback), and hence, switching component with reduced rating can be selected, and working voltage between primary and secondary sides of the main transformer T1 can be reduced, so as to reduce safety creepage and clearance between primary and secondary sides. In addition, D1, D2, D5 and D6 are used to rectify the input and charge boost capacitor C1, and D3 to D6 are used to rectify the input and charge storage capacitor C2. As the rectification and charging of storage capacitor C2 only happens at the power-on of the SMPS circuit, there is no specific requirement on the temperature, loss or continuous normal current. Therefore, low cost, low rating and smaller sized rectification components can be selected. Reasonable selection of rectification components of the two rectification circuits helps save cost, improve structure and improve heat dissipation.

Figure 11:
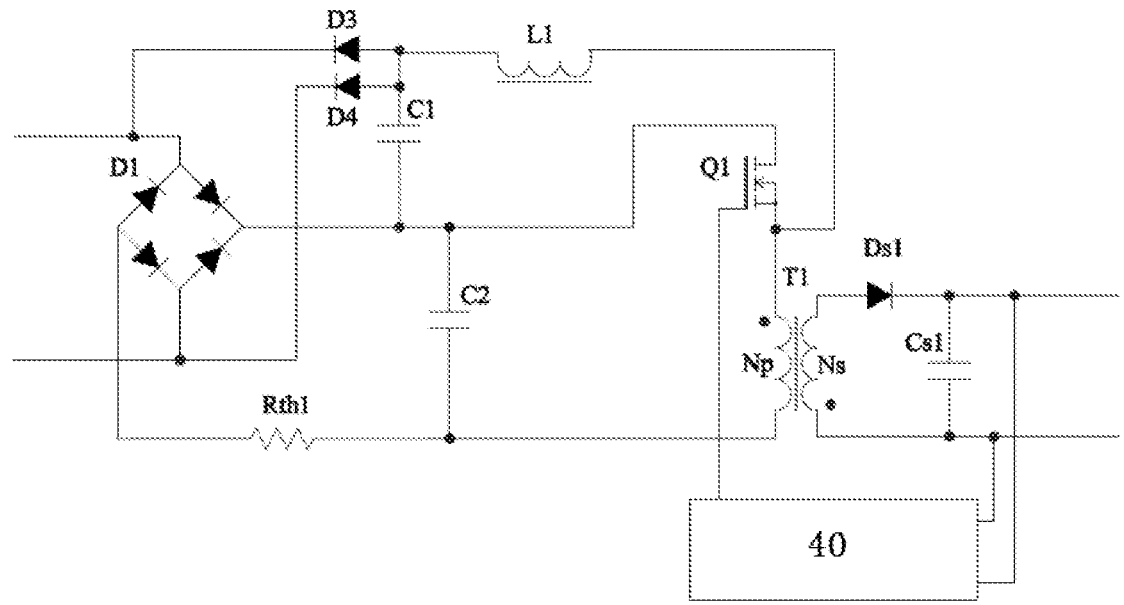
FIG. 11 is a schematic diagram of the SMPS circuit according to another embodiment of the present invention.

As shown in FIG. 11, the SMPS circuit further includes an inrush current limiting circuit, which is coupled to the first rectification loop, and is not coupled to the second rectification loop, the first boost loop, the second boost loop or the first DC-DC loop. For example, the SMPS circuit includes a first impedance component Rth1. A first terminal of the first impedance component Rth1 is connected between the output of the first rectification circuit and the second terminal of the storage capacitor C2. In this embodiment, the current limiting impedance component for preventing input surge is connected between the negative terminal of the storage capacitor C2 and D5 which charges the storage capacitor C2, to inhibit input surge current at the power-on of the power supply. Since this component does not belong to the boost loop, it has no loss during normal operation of the power supply. Compared with high-loss thermistor or expensive relay or Silicon Controlled Rectifier (SCR) circuit used in a conventional boost loop, the present invention improves efficiency, reduces temperature and saves cost.

Figure 12:
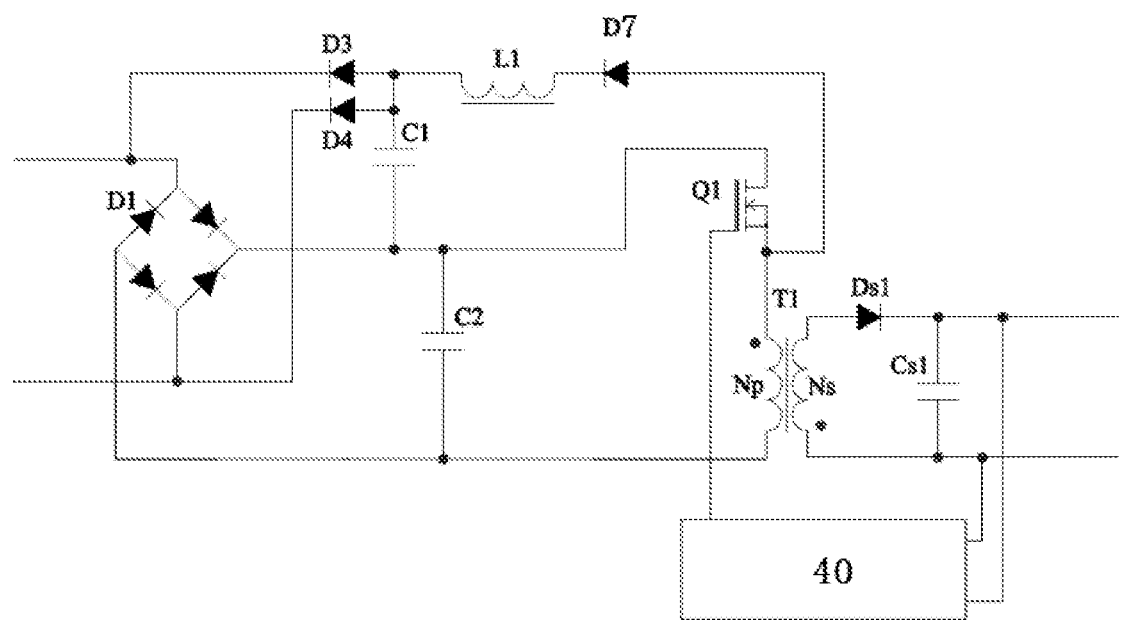
FIG. 12 is a schematic diagram of the SMPS circuit according to another embodiment of the present invention.
Figure 13:
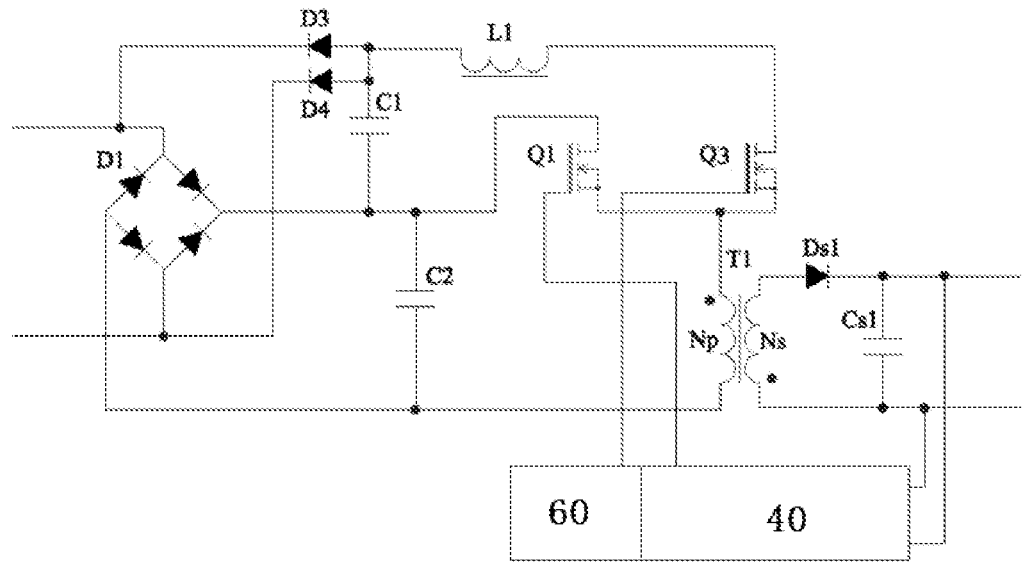
FIG. 13 is a schematic diagram of the SMPS circuit according to another embodiment of the present invention.

As shown in FIGS. 12 and 13, the SMPS circuit further includes a resonance prevention rectification component, wherein, when first switching component Q1 cuts off and after zero return of the current in boost inductor L1, the resonance prevention rectification component blocks the charging from the storage capacitor C2 to the boost inductor L1 and boost capacitor C1. For example, the resonance prevention rectification component could be a diode (see D7 in FIG. 12) or an FET (see Q3 in FIG. 13). The resonance prevention rectification component is connected between the second terminal of the boost inductor L1 and the source of the first switching component Q1, and forces the current between the second terminal of the boost inductor L1 and the source of the first switching component Q1 to flow unidirectionally toward the boost inductor L1.

This embodiment shows the technical solution of adding D7 or Q3 to eliminate resonance current of C1, C2, L1, T1 when the present invention is designed to operate at low switching frequency, low load, or with low inductance L1, T1. This approach is suitable to be used in combination with any of the above mentioned embodiments. When D7 is substituted by switching component Q3, the operation principle remains the same. Although an independent switching component Q3 is added into the boost circuit, an expensive boost rectification power component can be eliminated compared with conventional boost converters, and hence completely prevents loss on the boost rectification power component, increases the efficiency of the power supply and saves the space. The switching component Q3 can be controlled by using the driving signal of switching component Q1, and may further extend the cut-off time of Q3 after Q1's cut-off, so as to lower Q3's impedance during the boost process, reduce the loss and improve the efficiency of the power supply. This approach is suitable to be used in combination with any of the above mentioned embodiments.

In the SNIPS circuit shown in FIGS. 1-13, the DC-DC converter is a single-ended flyback power supply circuit, and the transformer or DC-DC inductor T1 is a flyback transformer. The transformer T1 has a secondary winding Ns that supplies energy to the load through the output rectification component Ds1 and the filter capacitor Cs1. That is, the single ended flyback power supply circuit includes transformer T1, filter capacitor Cs1, and output rectification component Ds1, wherein the input terminals (i.e. both terminals of the primary winding Np) of the transformer T1 are respectively connected to the storage capacitor C2 and the first switching component Q1, and the output terminals (i.e. both terminals of the secondary winding Ns) of the transformer T1 are respectively connected to anode of the output rectification component Ds1 and second terminal of the filter capacitor Cs1. The cathode of the output rectification component Ds1 is connected to first terminal of the filter capacitor Cs1.

The control method suitable to be used for the SMPS circuit of the present invention could be PWM or PFM. Take pulse width modulation (PWM) as an example, which is normally used with externally-driven flyback converters. PWM is to fix or control the operating frequency within a narrow range, and to adjust the output voltage, current or power by adjusting duty of the pulses. Pulse Frequency Modulation (PFM) is normally used with Ringing-choke-converter (RCC) flyback converters. Energy stored in the magnetic core of the transformer during closing of the switch is completely released to the secondary side when the switch is opened, and the output voltage, current or power is adjusted by adjusting the open close frequency.

Figure 14:
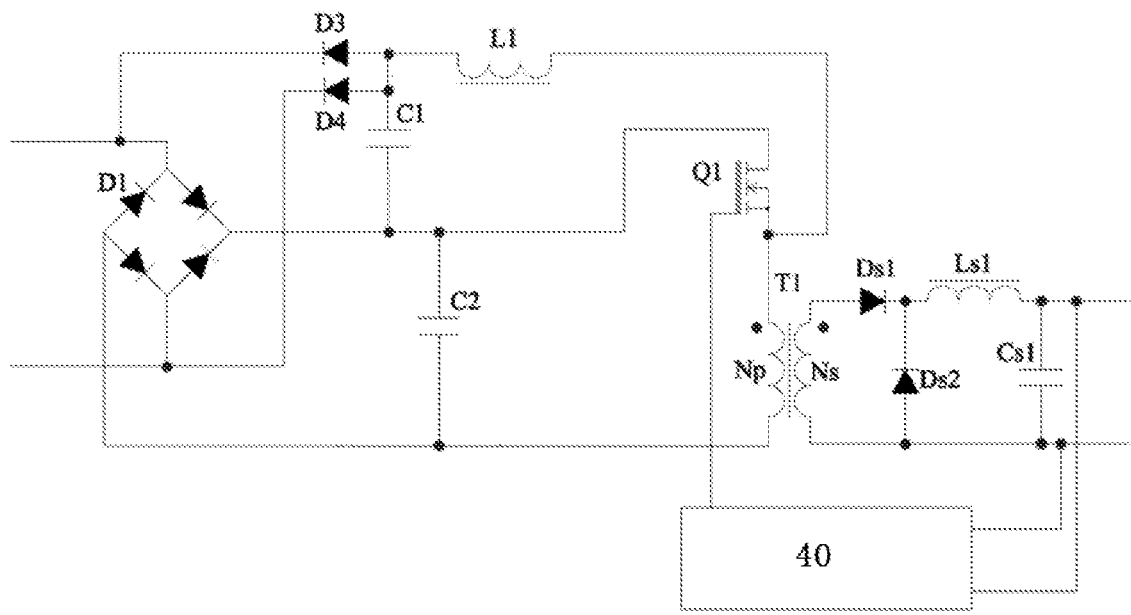
FIG. 14 is a schematic diagram of the SMPS circuit according to another embodiment of the present invention.

Specifically, in the SMPS circuit as shown in FIG. 14, the DC-DC converter is a forward power supply circuit, and the transformer has a secondary winding Ns that charges choke coil Ls1 through the first output rectification component Ds1 and the second output rectification component Ds2. The choke coil Ls1 supplies energy to load through the filter capacitor Cs1. For example, the single-ended forward power supply circuit includes transformer T1, filter capacitor Cs1, choke coil Ls1, first output rectification component Ds1 and second output rectification component Ds2, wherein input terminals of the transformer T1 are connected to the storage capacitor C2 and the first switching component Q1; two output terminals of the transformer T1 are respectively connected to anodes of the first and second output rectification components Ds1, Ds2 and second terminal of the filter capacitor Cs1. The cathodes of the first and second output rectification components Ds1, Ds2 are connected to the first terminal of the choke coil Ls1, and the second terminal of the choke coil Ls1 is connected to the first terminal of the filter capacitor Cs1.

Figure 15:
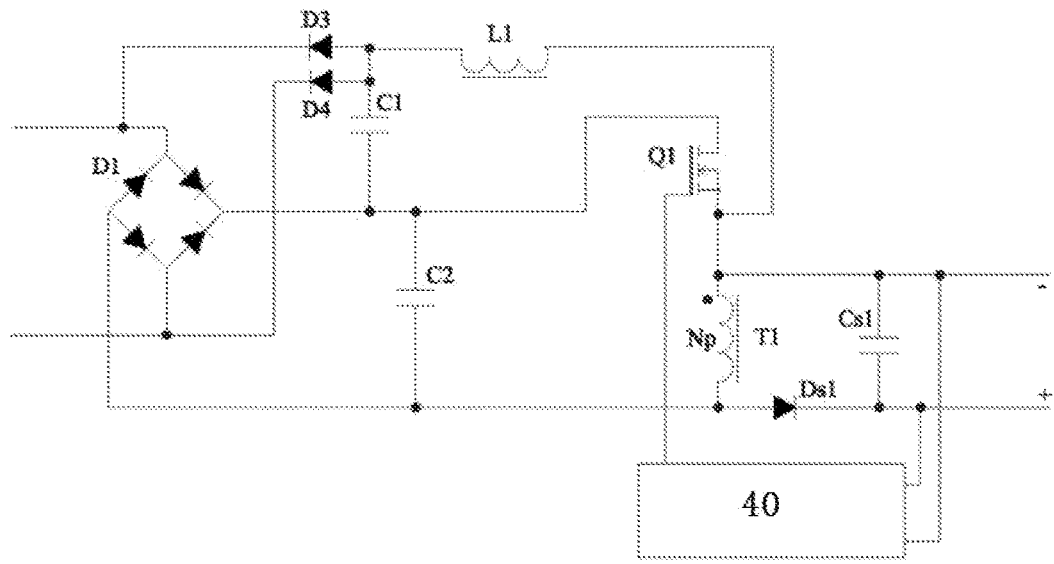
FIG. 15 is a schematic diagram of the SMPS circuit according to another embodiment of the present invention.

In the SMPS circuit as shown in FIG. 15, the DC-DC converter is a buck-boost circuit, the transformer or DC-DC inductor T1 is a buck-boost inductor, and the DC-DC inductor T1 outputs energy to the load through the output rectification component Ds1 and the filter capacitor Cs1. For example, the single-ended buck-boost circuit includes a buck-boost inductor T1, a filter capacitor Cs1 and an output rectification component Ds1, wherein the first terminal of the buck-boost inductor T1 is connected to the first switching component Q1 and the first terminal of the filter capacitor Cs1; the second terminal of the buck-boost inductor T1 is connected to the storage capacitor C2 and the anode of the output rectification component Ds1; and the cathode of the output rectification component Ds1 is connected to the second terminal of the filter capacitor Cs1. In this embodiment, the single-ended flyback circuit is replaced by a single-ended buck-boost circuit. The topology of the buck-boost circuit is actually a non-isolated flyback topology, and the storage and non-isolated release of the energy is accomplished by the buck-boost inductor L1. As for the dual-rectification and boost circuits, their operation principles are the same as those described above.

Figure 16:
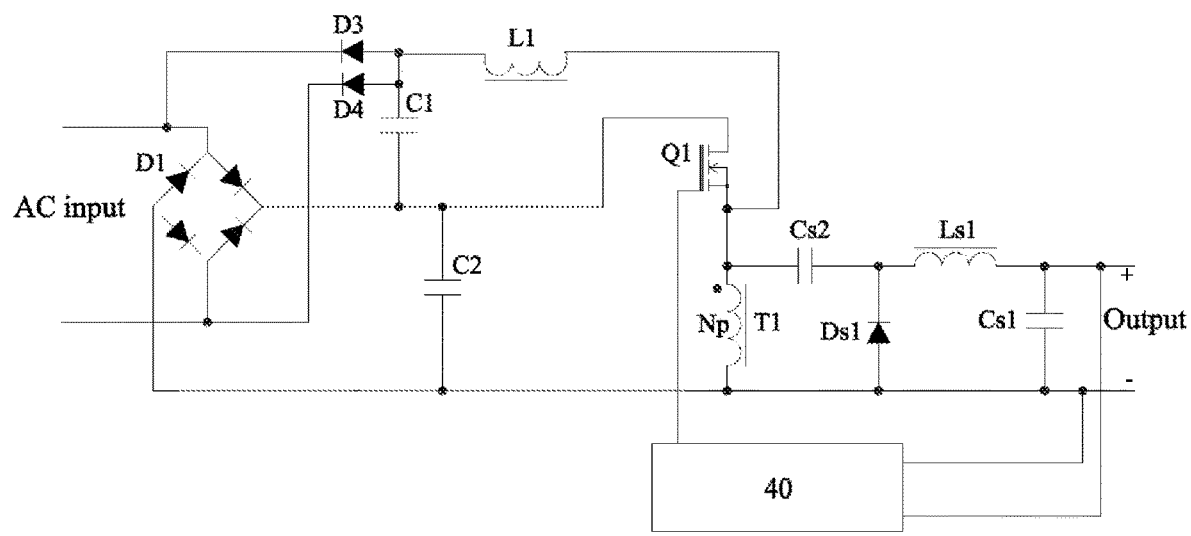
FIG. 16 is a schematic diagram of the SMPS circuit according to another embodiment of the present invention.

In the SMPS circuit as shown in FIG. 16, the DC-DC converter is a ZETA circuit, the transformer or DC-DC inductor T1 is a ZETA inductor, the ZETA inductor T1 charges the choke coil Ls1 through the coupling capacitor Cs2 and the output rectification component Ds1, and the choke coil Ls1 outputs energy to the load through the filter capacitor Cs1. For example, the ZETA circuit includes a ZETA inductor T1, a first filter capacitor Cs1, a second filter capacitor Cs2, a choke coil Ls1 and an output rectification component Ds1, wherein the first terminal of the ZETA inductor T1 is connected to the first switching component Q1 and the first terminal of the first filter capacitor Cs1; the second terminal of the ZETA inductor T1 is connected to the storage capacitor C2, the anode of the output rectification component Ds1 and the second terminal of the second filter capacitor Cs2; the cathode of the output rectification component Ds1 is connected to the second terminal of the first filter capacitor Cs1 and the first terminal of the choke coil Ls1; the second terminal of the choke coil Ls1 is connected to the first terminal of the second filter capacitor Cs2. In this embodiment, the single-ended flyback circuit is replaced by a ZETA circuit. Q1 drives both the boost inductor L1 and the ZETA inductor T1. Like in the single-ended flyback circuit, D1 to D6 and C1, C2 constitute a dual-rectification input circuit; Q1, L1, C1, C2 and T1 constitute a boost circuit; Q1, T1, Ds1, Cs1, Cs2 and Ls1 constitute a ZETA type DC-DC converter.

Figure 17:
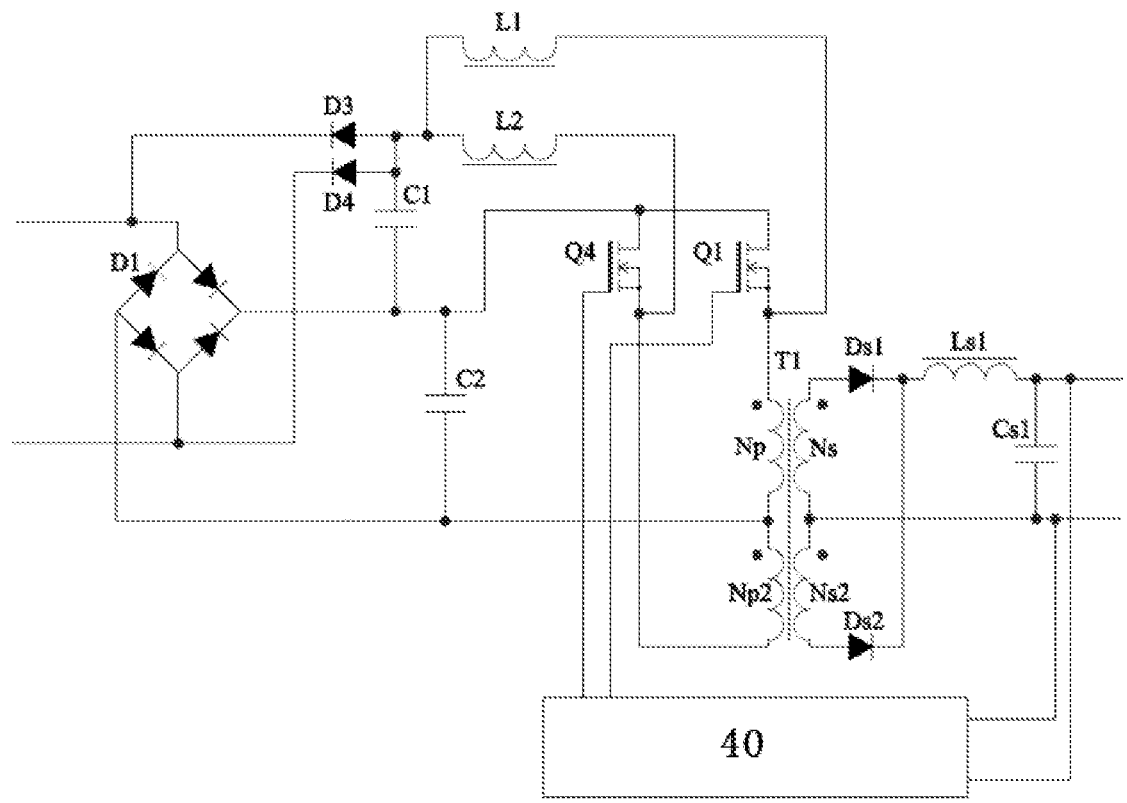
FIG. 17 is a schematic diagram of the SMPS circuit according to another embodiment of the present invention.

In the SMPS circuit as shown in FIG. 17, the DC-DC converter is a double-ended push-pull circuit, the transformer T1 charges the choke coil Ls1 through its secondary winding Ns1 and further through the first output rectification component Ds1 and second output rectification component Ds2, and the choke coil Ls1 outputs energy to the load through the filter capacitor Cs1. For example, the SMPS circuit further includes a push-pull switching component Q4 and a push-pull inductor L2. The push-pull switching component Q4 could be MOSFET, bipolar transistor, IGBT, SiC or GaN FET, etc. The first terminal of the push-pull inductor L2 is connected to the first terminal of the boost inductor L1. The second terminal of the push-pull inductor L2 is connected to the source of the push-pull switching component Q4 and the negative input terminal of the DC-DC converter. The drain of the push-pull switching component Q4 is connected to the drain of the first switching component Q1. The control electrode of the push-pull switching component Q4 is connected to the output terminal of the feedback and control unit 40. The double-ended push-pull circuit includes a transformer T1, a choke coil Ls1, a filter capacitor Cs1, a first output rectification component Ds1 and a second output rectification component Ds2. Two input terminals of the transformer T1 are respectively connected to the push-pull switching component Q4 and the first switching component Q1. Input side center tap of the transformer T1 is connected to the boost inductor L1, and two output terminals of the transformer T1 are respectively connected to the anodes of the first output rectification component Ds1 and second output rectification component Ds2. Output side center tap of the transformer T1 is connected to the second terminal of the filter capacitor Cs1. Cathodes of the first and second output rectification components Ds1 and Ds2 are connected to the first terminal of the choke coil Ls1, and the second terminal of the choke coil Ls1 is connected to the first terminal of the filter capacitor Cs1. In this embodiment, the single-ended flyback circuit is replaced by a single-ended push-pull circuit. Q1 drives both the boost inductor L1 and the primary winding Np of the transformer T1. Q4 drives both the push-pull inductor L2 and the primary winding Np2 of the transformer T1. The push-pull operation of Q1 and Q4 makes boost inductor L1 and push-pull inductor L2 operate alternatively, so as to operate in an interleaved boost mode.

Figure 18:
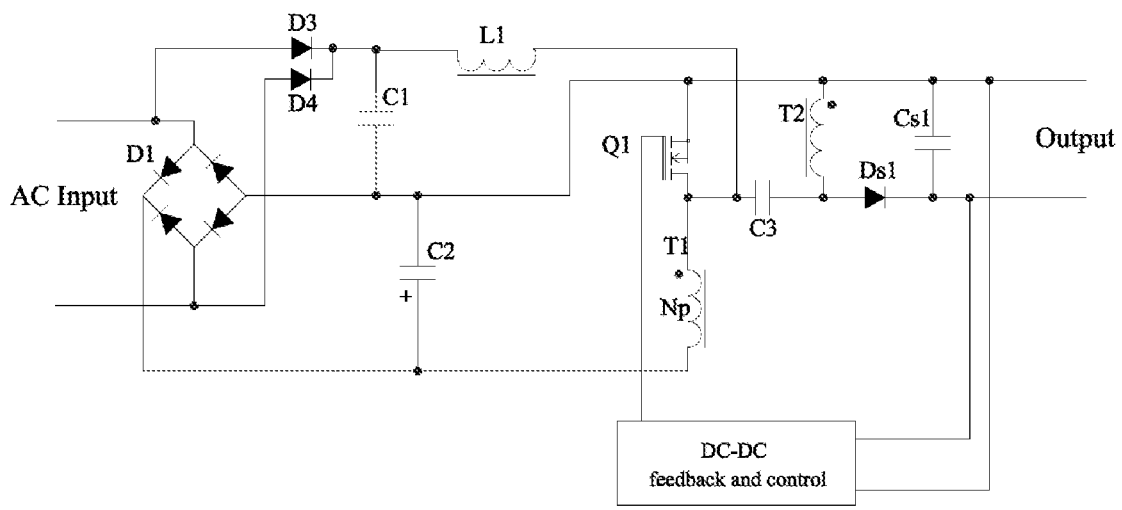
FIG. 18 is a schematic diagram of the SMPS circuit according to another embodiment of the present invention.

As shown in FIG. 18, the DC-DC converter is a SEPIC circuit, and the DC-DC inductor or transformer includes a SEPIC inductor T1 and a choke coil T2. The SEPIC inductor T1 and the choke coil T2 are coupled to form an isolated transformer to achieve isolated output. When the first switching component Q1 conducts, the storage capacitor C2 charges the SEPIC inductor T1, the coupling capacitor C3 charges the choke coil T2, and the energy accumulated in the filter capacitor Cs1 is released to the load. When the first switching component Q1 cuts off, the DC-DC inductor or transformer T1 supplies energy to the load through the coupling capacitor C3, filter capacitor Cs1 and output rectification component Ds1; and the choke coil T2 also supplies energy to the load through the output rectification component Ds1 and filter capacitor Cs1.

In the SMPS circuits of the present invention, two input rectification circuits respectively for the storage capacitor C2 and the boost capacitor C1 are provided to output the corresponding voltages. The storage capacitor C2 and the boost capacitor C1 are connected at the same polarity (positive voltage terminals). The storage capacitor C1 is also an output capacitor of the boost circuit. Further provided are DC-DC converter, and first switching component Q1 which is connected between positive input terminals of the storage capacitor C2 (positive voltage terminal) and DC-DC converter (primary winding of transformer T1 or buck-boost inductor L1 or ZETA inductor etc.). Boost inductor L1 and boost capacitor C1 are connected in series and then parallelly connected to the first switching component Q1. One terminal of the boost capacitor C1 is connected to the positive terminal of the storage capacitor C2, and the other terminal is connected to two poles (L and N) of AC input through the second input reification circuit, or connected to negative pole of DC input. Feedback and control unit 40 controls the turn-on (conduct) and turn-off (cut off) of the first switching component Q1 to implement conversion and output of the SMPS circuit, enabling the cooperative operation of boost circuit and conventional DC-DC power supply topology (flyback, buck-boost, forward, push-pull, Zeta, etc.), achieving boost and conversion of input voltage and also PFC of AC power supply. The SMPS circuit of the present invention adopts active PFC circuit (boost circuit), which has good active PFC performance. As the PWM (or PFM) control unit and the power switching component (first switching component) in the DC-DC converter (flyback, forward) downstream to the PFC circuit is shared, the PWM control unit and power switching component required in a conventional boost PFC circuit can be eliminated, thereby reducing the cost and volume, simplifying the design of power supply product, and achieving advantages of high performance, low cost and miniaturization.

Figure 19:
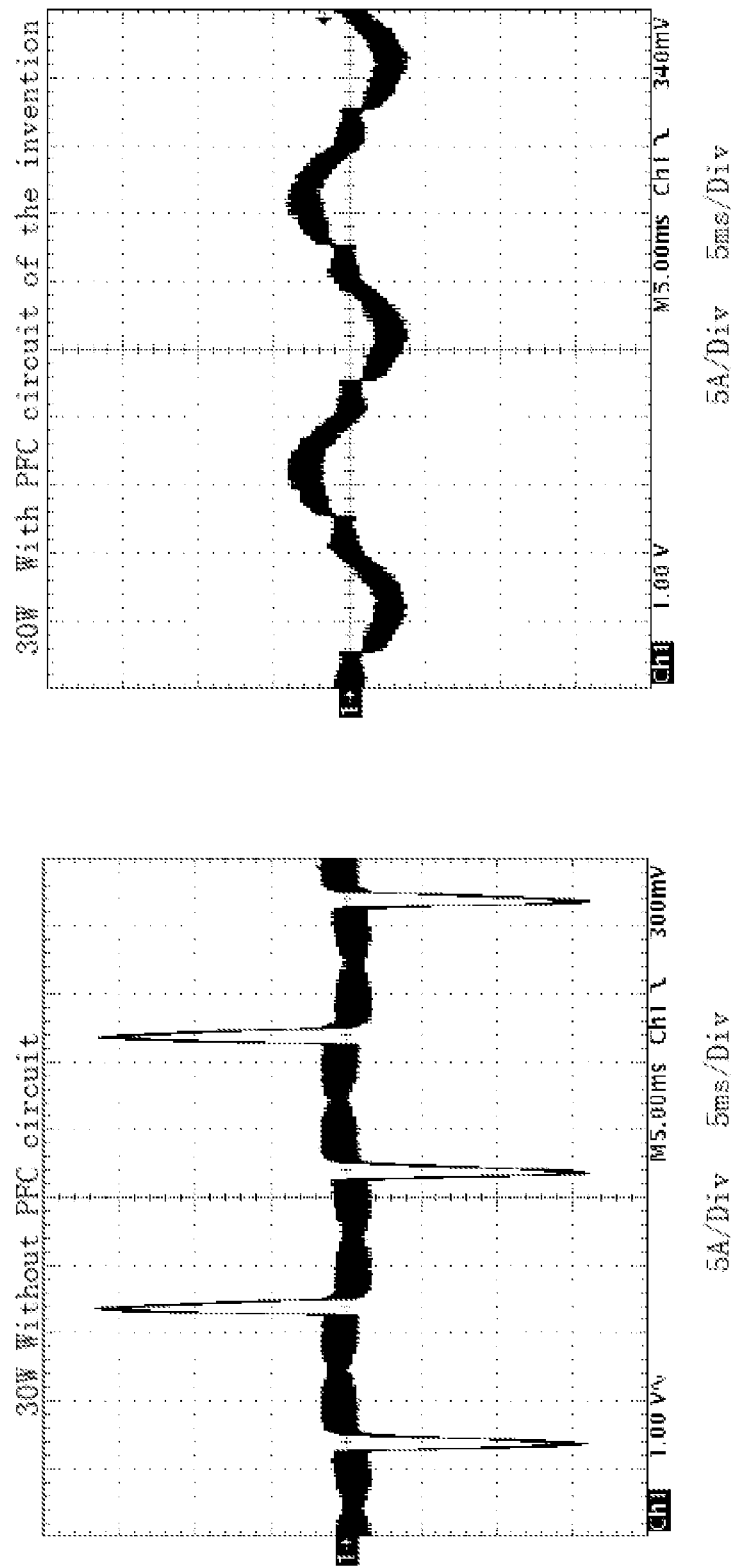
FIG. 19 shows input current waveform comparison between the prior art and the PFC of the present invention.

FIG. 19 shows the waveform that is similar to the input AC sinusoidal current waveform achieved by the present invention and a sinusoidal current waveform of a SMPS circuit without the PFC circuit.

Figure 20:
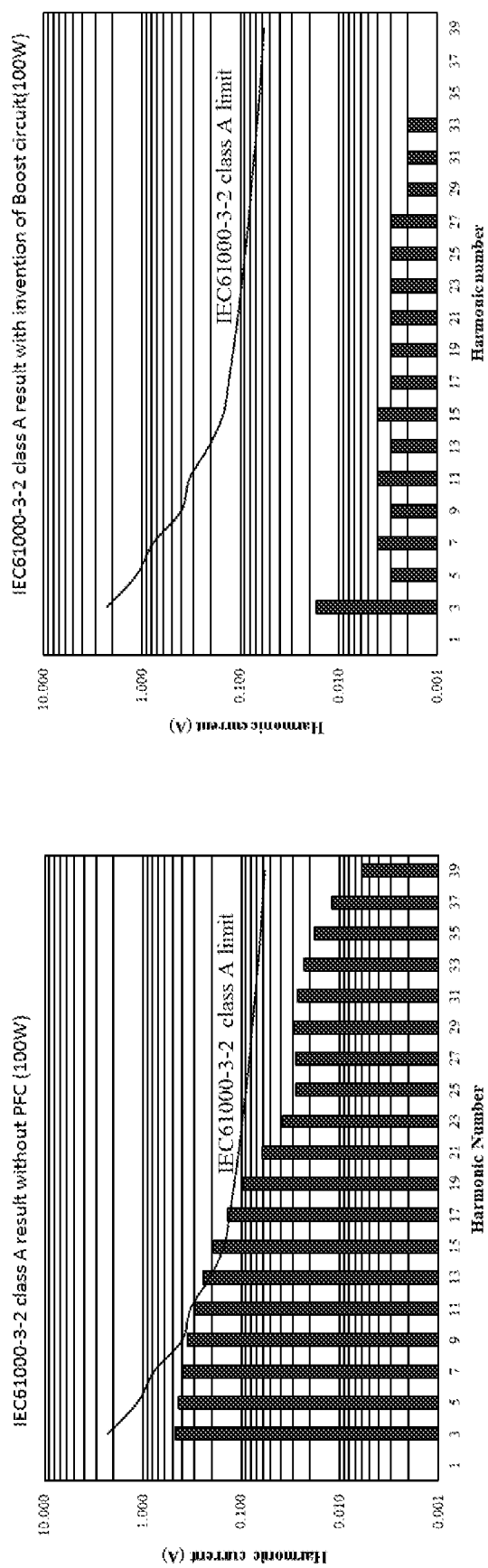
FIG. 20 shows comparison between IEC61000-3-2 class A results of the prior art and the SMPS circuit of the present invention.

FIG. 20 shows comparison between IEC61000-3-2 class A results of the SMPS circuit of the present invention incorporating the single-ended flyback DC-DC converter and the SMPS circuit without the PFC circuit.

According to the present invention, a low cost, less part count, compact SMPS circuit with active PFC function can be achieved. Firstly, the result of PFC can shape an AC input current into a substantially sinusoidal waveform (FIG. 19) satisfying IEC61000-3-2 requirements on input harmonics (FIG. 20). Secondly, the boost circuit and the flyback (or forward) DC-DC converter of the present invention share one switching component, eliminating the switching component and corresponding drive circuit required by traditional PFC circuits, reducing the cost and part count, simplifying the circuit so as to improve reliability, and can be installed with a smaller PCB space. Moreover, during the cut-off of the switching component, the current flow into the DC-DC transformer has a reversed direction compared to that during turn-on of the switching component, it partially helps reset the transformer and reduce magnetic flux density Bmax, reduce core loss, prevent saturation, so as to enable cost reduction of the components. Furthermore, as the active PFC circuit shares the PWM control of the DC-DC converter, the control can be designed as open-loop control, so that there is no problem of loop stability, also there is no audible noise problem due to closed-loop control encountered by traditional active PFC circuits during turn-on or operation of the circuit.

FIG. 21 is a flyback circuit of the present invention in which, the first rectification circuit, the boost capacitor C1 and the storage capacitor C2 are connected at their negative voltage terminals. As the negative terminals are connected, the first switching component Q1 can be disposed at the negative side of the storage capacitor, which facilitates the design of the control and driving circuit.

In summary, although different configurations of the switching mode power supply circuit have been detailedly described by the above embodiments, the present invention includes, but is not limited to, the configurations described in the above embodiments. Any alternatives based on the above embodiments are also within the protection scope of the present invention. A person skilled in the art may make inferences based on the above embodiments.

The above embodiments are described in a progressive manner. Each embodiment focuses on the differences from other embodiments, and the same or similar parts between the embodiments may refer to each other. The system disclosed in the embodiments may correspond to the method disclosed in the embodiments and may be described in a relatively simple way. The relevant contents can be referred to from the description of the methods.

The above descriptions are merely descriptions of the preferred embodiments of the present invention, and do not limit the scope of the present invention. Any changes or modifications made by those of ordinary skill in the art based on the above disclosure shall fall within the protection scope of the claims.

What is claimed is:

1. A switching mode power supply circuit, comprising a boost inductor, a boost capacitor, a storage capacitor, a transformer or DC-DC inductor, a first switching component, an output rectification component, a filter capacitor, a feedback and control circuit, a first rectification circuit and a second rectification circuit, wherein:
the first rectification circuit and the storage capacitor form a first rectification loop; the second rectification circuit and the boost capacitor form a second rectification loop; the first rectification circuit and the storage capacitor and the boost capacitor are connected at terminals of a same polarity;
the boost inductor, the boost capacitor, the storage capacitor, the transformer or DC-DC inductor, and the first switching component constitute a boost conversion circuit; the storage capacitor, the transformer or DC-DC inductor, the first switching component, the output rectification component and the filter capacitor constitute a DC-DC converter;
when the first switching component conducts, the boost inductor, the boost capacitor and the first switching component form a first boost loop in which the boost inductor stores energy; and the storage capacitor, the first switching component and the transformer or DC-DC inductor form a first DC-DC loop;
when the first switching component cuts off, the boost inductor, the boost capacitor, the storage capacitor and the transformer or DC-DC inductor form a second boost loop; and the transformer or DC-DC inductor, the output rectification component and the filter capacitor form a second DC-DC loop;
the filter capacitor supplies energy to a load; the feedback and control circuit is configured to output a chopping wave with a certain frequency and duty to drive the first switching component to conduct or cut off, so as to control an output of voltage or current or power for the load.

2. The switching mode power supply circuit of claim 1, further comprising a second switching component, wherein the boost inductor, the boost capacitor, the storage capacitor, the transformer, the first switching component and the second switching component constitute the boost conversion circuit; the storage capacitor, the transformer, the first switching component, the second switching component, the output rectification component and the filter capacitor constitute the DC-DC converter;
when the first switching component and the second switching component both conduct, the boost inductor, the boost capacitor and the first switching component form the first boost loop in which the boost inductor stores the energy; and the storage capacitor, the first switching component, the second switching component and the transformer form the first DC-DC loop;
when the first switching component cuts off and the second switching component conducts or cuts off, the boost inductor, the boost capacitor, the storage capacitor, the transformer and the second switching component form the second boost loop; and the transformer, the output rectification component and the filter capacitor form the second DC-DC loop.

3. The switching mode power supply circuit of claim 1, further comprising an inrush current limiting circuit that is coupled to the first rectification loop and not coupled to any of the second rectification loop, the first boost loop, the second boost loop and the first DC-DC loop.

4. The switching mode power supply circuit of claim 1, further comprising a resonance prevention rectification component, wherein when the first switching component cuts off and after zero return of a current of the boost inductor, the resonance prevention rectification component prevents the storage capacitor from charging the boost inductor and the boost capacitor.

5. The switching mode power supply circuit according to claim 1, wherein the DC-DC converter is a flyback power supply, and the transformer or DC-DC inductor is a flyback transformer, wherein the flyback transformer has a secondary winding that supplies energy to the load via the output rectification component and the filter capacitor.

6. The switching mode power supply circuit according to claim 1, wherein the DC-DC converter is a forward power supply, the switching mode power supply circuit further comprises a choke coil, and the output rectification component comprises a first output rectification component and a second output rectification component, wherein the transformer has a secondary winding that charges the choke coil via the first output rectification component and the second rectification component, and the choke coil supplies energy to the load via the filter capacitor.

7. The switching mode power supply circuit according to claim 1, wherein the DC-DC converter is a buck-boost circuit, and the transformer or DC-DC inductor is a buck-boost inductor, wherein the buck-boost inductor supplies energy to the load through the output rectification component and the filter capacitor.

8. The switching mode power supply circuit according to claim 1, wherein the DC-DC converter is a ZETA circuit, the switching mode power supply circuit further comprises a coupling capacitor and a choke coil, and the transformer or DC-DC inductor is a ZETA inductor, wherein the ZETA inductor charges the choke coil through the coupling capacitor and the output rectification component, and the choke coil supplies energy to the load via the filter capacitor.

9. The switching mode power supply circuit according to claim 1, wherein the DC-DC converter is a double-ended push-pull circuit, the switching mode power supply circuit further comprises a choke coil, and the output rectification component comprises a first output rectification component and a second output rectification component, wherein the transformer has a secondary winding that charges the choke coil through the first output rectification component and the second output rectification component, and the choke coil supplies energy to the load via the filter capacitor.

10. The switching mode power supply circuit according to claim 1, wherein the DC-DC converter is a SEPIC circuit, the switching mode power supply circuit further comprises a coupling capacitor and a choke coil, and the transformer or DC-DC inductor includes the SEPIC inductor and the choke coil; wherein when the first switching component conducts, the storage capacitor charges the SEPIC inductor, the coupling capacitor charges the choke coil, and an accumulated energy on the filter capacitors is supplied to the load; when the first switching component cuts off, the SEPIC inductor supplies energy to the load through the coupling capacitor, the filter capacitor and the output rectification component, and the choke coil also supplies energy to the load through the output rectification component and the filter capacitor.

11. The switching mode power supply circuit according to claim 1, wherein the first rectification circuit and the second rectification circuit each comprise a diode or a switching component serving as a rectification component, when the rectification component is implemented as a switching component, the switching mode power supply circuit further comprises an AC phase detecting and rectification control unit that monitors a phase of an AC input current to the first rectification circuit and the second rectification circuit, and controls the switching component to conduct or cut off.

* * * * *